United States Patent
Jun

(10) Patent No.: US 12,128,813 B2
(45) Date of Patent: Oct. 29, 2024

(54) OPTICAL MODULE AIMING SYSTEM AND OPTICAL MODULE AIMING METHOD USING THE SAME

(71) Applicant: HYUNDAI MOBIS CO., LTD., Seoul (KR)

(72) Inventor: Young Geun Jun, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/493,691

(22) Filed: Oct. 24, 2023

(65) Prior Publication Data
US 2024/0198889 A1 Jun. 20, 2024

(30) Foreign Application Priority Data
Dec. 19, 2022 (KR) .................. 10-2022-0177978

(51) Int. Cl.
*F21S 41/25* (2018.01)
*B60Q 1/068* (2006.01)
*B60Q 1/08* (2006.01)
*F21S 41/47* (2018.01)
*F21S 41/692* (2018.01)

(52) U.S. Cl.
CPC ............. *B60Q 1/085* (2013.01); *B60Q 1/068* (2013.01); *F21S 41/25* (2018.01); *F21S 41/47* (2018.01); *F21S 41/692* (2018.01)

(58) Field of Classification Search
CPC ...... B60Q 1/085; B60Q 1/068; B60Q 1/1423; F21S 41/25; F21S 41/285; F21S 41/47
See application file for complete search history.

(56) References Cited

U.S. PATENT DOCUMENTS

| | | | |
|---|---|---|---|
| 2009/0073703 A1* | 3/2009 | Inaba | F21S 41/40 362/460 |
| 2011/0080092 A1* | 4/2011 | Matsumoto | F21S 41/663 340/937 |
| 2019/0360657 A1* | 11/2019 | Mayer | F21S 41/36 |
| 2021/0129745 A1* | 5/2021 | Cha | H05B 45/44 |
| 2022/0282845 A1* | 9/2022 | Colombel | B60Q 1/076 |

FOREIGN PATENT DOCUMENTS

KR 10-2273381 7/2021

OTHER PUBLICATIONS

English Language Abstract of KR 10-2273381 published Jul. 7, 2021.

* cited by examiner

*Primary Examiner* — Evan P Dzierzynski
(74) *Attorney, Agent, or Firm* — DLA Piper LLP US

(57) ABSTRACT

An optical module, and more particularly, an optical module aiming system which may individually aim a position of each module, by configuring an optical module in charge of a cut-off area, that is, forming a hot zone, in which an outer lens, a primary optical system, and other parts are aimed together to thus enable adjustment aiming of a hot zone where the most regulations are concentrated, and configuring an optical module forming a wide zone or high beam so that a vertical position of a shield may be adjusted from the outside using a leaf spring and a push bolt.

17 Claims, 12 Drawing Sheets

OPTICAL MODULE AIMING SYSTEM AND OPTICAL MODULE AIMING METHOD USING THE SAME

CROSS-REFERENCE TO RELATED APPLICATIONS

This application claims priority under 35 U.S.C. § 119 to Korean Patent Application No. 10-2022-0177978, filed on Dec. 19, 2022, in the Korean Intellectual Property Office, the disclosure of which is incorporated herein by reference in its entirety.

TECHNICAL FIELD

The following disclosure relates to an optical module, and more particularly, to an optical module aiming system.

BACKGROUND

In accordance with a design trend in which a main light source of a headlamp has a slimmer opening, headlamps with an opening slim and long in a horizontal or vertical direction have appeared. This conventional headlamp design may have increased efficiency by sharing one slim and long outer lens in one main light source module, and dividing an internal optical system into two or more parts for a beam pattern to be divided and implemented for each individual area.

Here, a low beam module may include sub modules respectively in charge of a hot zone (or a cut-off area) and a wide zone (or a spreading area), an android debug bridge (ADB) module may properly distribute segments into two or more sub modules, and a bi-function module in which both a low beam and a high beam (including an ADB) are included in one module may include a plurality of optical modules each serving a function for each area. Therefore, it is necessary to accurately fit each optical module to a designed position when installing a lamp on a vehicle in a production line, or when a user needs to aim each module afterward. However, in the conventional headlamp, all the optical modules may be aimed in a unit and accordingly, an individual pattern of the sub module cannot be aimed.

RELATED ART DOCUMENT

Patent Document (Patent Document 1) Korean Patent No. 10-2273381, entitled "Headlight module for vehicles", and published on Jun. 30, 2021

SUMMARY

An embodiment of the present disclosure is directed to providing an optical module aiming system which may individually aim a position of each module, by configuring an optical module in charge of a cut-off area or forming a hot zone, in which an outer lens, a primary optical system, and other parts are aimed together to thus enable adjustment aiming of a hot zone where the most regulations are concentrated, and configuring an optical module forming a wide zone or high beam so that a vertical position of a shield may be adjusted from the outside using a leaf spring and a push bolt, and an optical module aiming method using the same.

In one general aspect, an optical module aiming system includes: an optical module unit including a plurality of optical modules including at least one light source; a module housing including a plurality of support parts including each support surface in contact with and coupled to a lower surface of each optical module, and a connection part extending from one end of each support part and formed in a direction perpendicular to the support surface; and an aiming unit individually adjusting a position of each optical module.

The optical module unit may include a first module providing a low beam hot zone, a second module providing a low beam wide zone, and a third module providing the low beam wide zone or a high beam, and the support part may include a first support part coupled to a lower surface of the first module, a second support part coupled to a lower surface of the second module, and a third support part coupled to a lower surface of the third module.

The aiming unit may include a shield coupled to the other end of the second support part or that of the third support part, and the shield may include a shield plate extending in the other direction of the second support part or that of the third support part, a coupling plate in contact with and coupled to the other surface of the second support part or that of the third support part, and an adjustment bolt having one end passing through the coupling plate and the second support part or the third support part, and the other end in contact with a lower surface of the shield plate to support the shield plate.

The system may further include an angle-changing shaft disposed at a junction between the shield plate and the coupling plate, and passing through one end of the shield plate and one end of the coupling plate.

The adjustment bolt may have a predetermined angle that is not perpendicular to the other surface of the second support part or that of third support part.

The aiming unit may include at least two vertical position adjustment holes or at least two horizontal position adjustment holes, each having a cross shape and passing through the connection part, the vertical position adjustment holes may be spaced apart from each other in a horizontal direction of the connection part, the horizontal position adjustment holes may be spaced apart from each other in a vertical direction of the connection part, and a fastener may be coupled to each of the vertical position adjustment holes and the horizontal position adjustment holes.

The system in which the second support part or the third support part is an entity independent from the connection part, may further include: at least two vertical position adjustment holes extending in the vertical direction and respectively passing through the connection part and the second support part and the connection part or the third support part; and a fastener passing through the second support part and the connection part or the third support part and the connection part together and connecting the support part and the connection part to each other.

The connection part may include a lens holder coupled to each of its upper and lower ends, and a projection lens sandwiched between the respective lens holders.

In another general aspect, an optical module aiming method using the optical module aiming system as described above includes: (a) aiming a position of a module housing and that of an optical module unit; and (b) aiming a position of a second module and that of a third module in detail.

The operation (a) may include: (a1) separating a fastener from a vertical position adjustment hole or a horizontal position adjustment hole; (a2) moving and adjusting the position of the module housing in a vertical direction; and (a3) inserting the fastener into the vertical position adjustment hole or the horizontal position adjustment hole again.

The operation (b) may include (b1) adjusting a coupling position of an adjustment bolt.

The operation (b) may include: (b2) separating a fastener from a vertical position adjustment hole; (b3) moving and adjusting a position of the second module or that of the third module in a vertical direction; and (b4) inserting the fastener into the vertical position adjustment hole again.

DETAILED DESCRIPTION OF EMBODIMENTS

Hereinafter, the spirit of the present disclosure is described in detail with reference to the accompanying drawings. Terms and words used in the specification and claims are not to be construed as general or dictionary meanings, and are to be construed as meanings and concepts meeting the spirit of the present disclosure based on a principle that the inventors may appropriately define the concepts of terms in order to describe their inventions in best mode.

Hereinafter, the description describes a basic configuration of an optical module aiming system 1000 of the present disclosure with reference to FIGS. 1 to 4.

Figure 1:
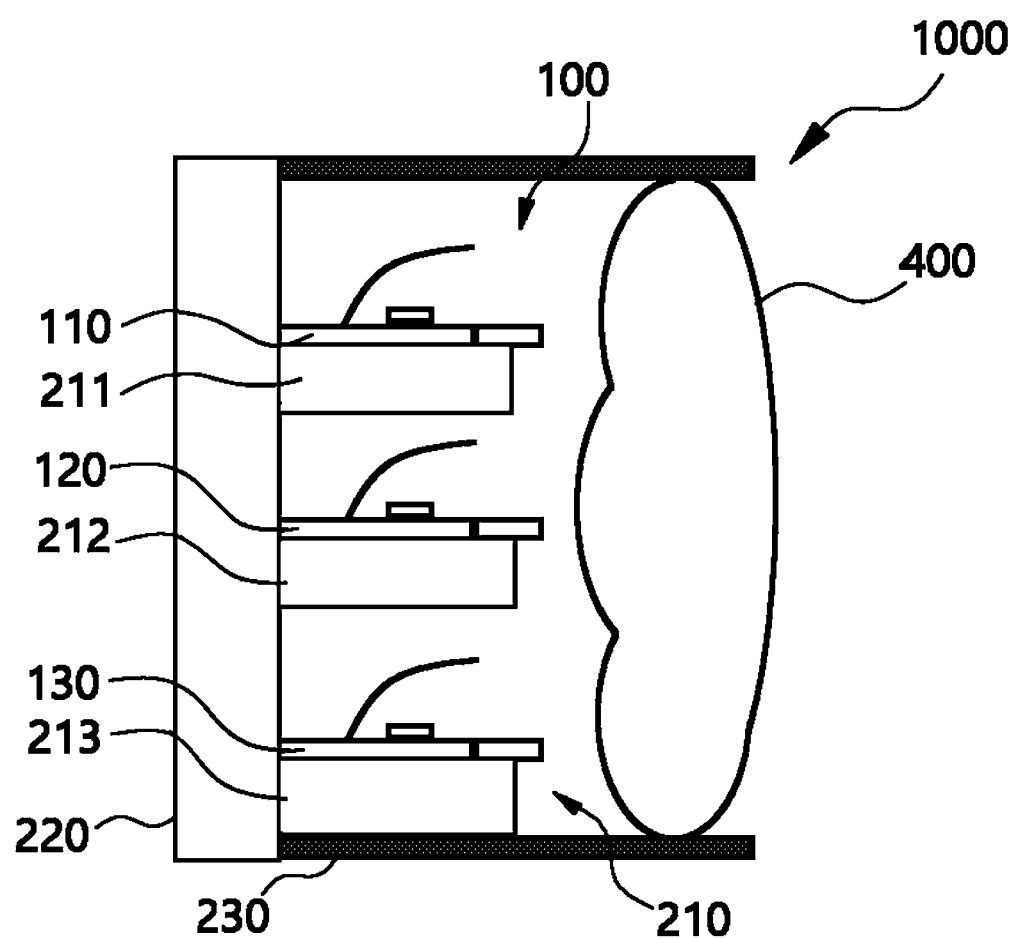
FIG. 1 is a schematic view showing an optical module aiming system of the present disclosure.

As shown in FIG. 1, the optical module aiming system 1000 of the present disclosure may include an optical module unit 100 including a plurality of optical modules including at least one light source. In this way, in the system 1000 including the plurality of optical modules 100, an area of a beam pattern may be divided and implemented by each optical module even when a light emission area is long. In addition, the optical module aiming system 1000 of the present disclosure may include a module housing 200 fixing a position of the above-mentioned optical module. The module housing 200 may include a plurality of support parts 210 including each support surface in contact with and coupled to a lower surface of each optical module, and a connection part 220 extending from one end of each support part 210 and formed in direction perpendicular to the support surface.

Here, the connection part 220 may include a lens holder 230 coupled to each of its upper and lower ends, and a projection lens 400 sandwiched between the respective lens holders 230.

In addition, the optical module aiming system 1000 of the present disclosure may include an aiming unit 300 individually adjusting the position of each optical module. The aiming unit 300 may individually adjust the top, bottom, left, or right position of each optical module of the optical module unit 100 described above. Furthermore, the aiming unit 300 may individually adjust the position of the optical module unit even after being combined with the support part 210 and the module housing. The optical module aiming system 1000 of the present disclosure including the aiming unit 300 may be easily utilized when it is necessary to aim a correct position of the optical module in a process of inspecting an assembly line, or when a user wants to individually aim the position of optical module arbitrarily, and its utility may thus be maximized.

In addition, the optical module unit 100 may include a first module 110 providing a low beam hot zone, a second module 120 providing a low beam wide zone, and a third module 130 providing the low beam wide zone or a high beam, and the support part 210 may include a first support part 211 coupled to a lower surface of the first module 110, a second support part 212 coupled to a lower surface of the second module 120, and a third support part 213 coupled to a lower surface of the third module 130.

Figure 2:
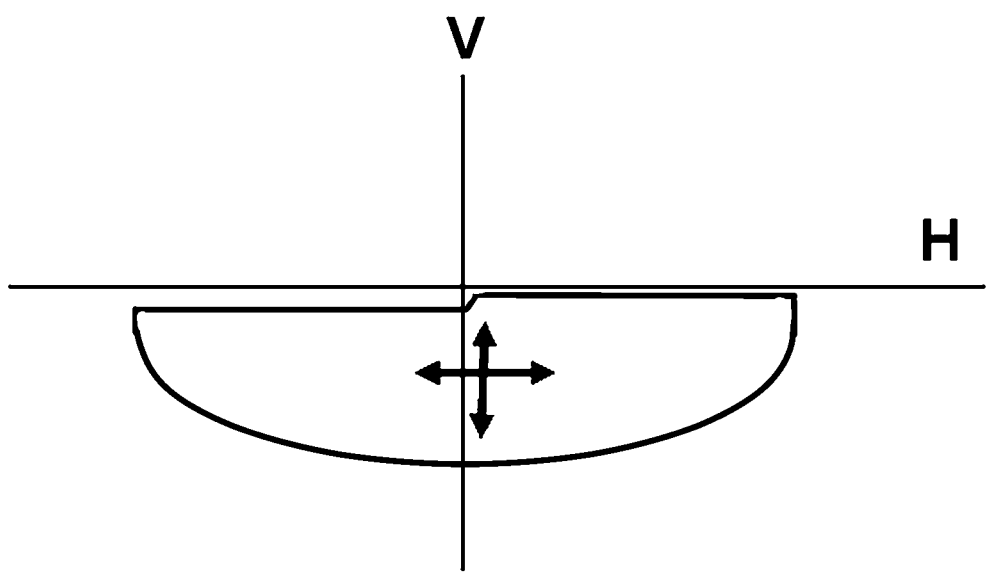
FIG. 2 is a schematic view showing a light generation area of a first module of the present disclosure.

In more detail, as shown in FIG. 2, the first module 110 may implement a low beam, and implement a low beam hot zone with a cut-off. The low beam hot zone implemented by the first module 110 may require the concentrated regulations, and a clearly and precisely defined cut-off position. Accordingly, the first module 110 may be required to be finely positioned in a vertical or horizontal direction, and may be required to be finely positioned together with the lens 400 because its positional relationship with the lens 400 also requires no error.

Figure 3:
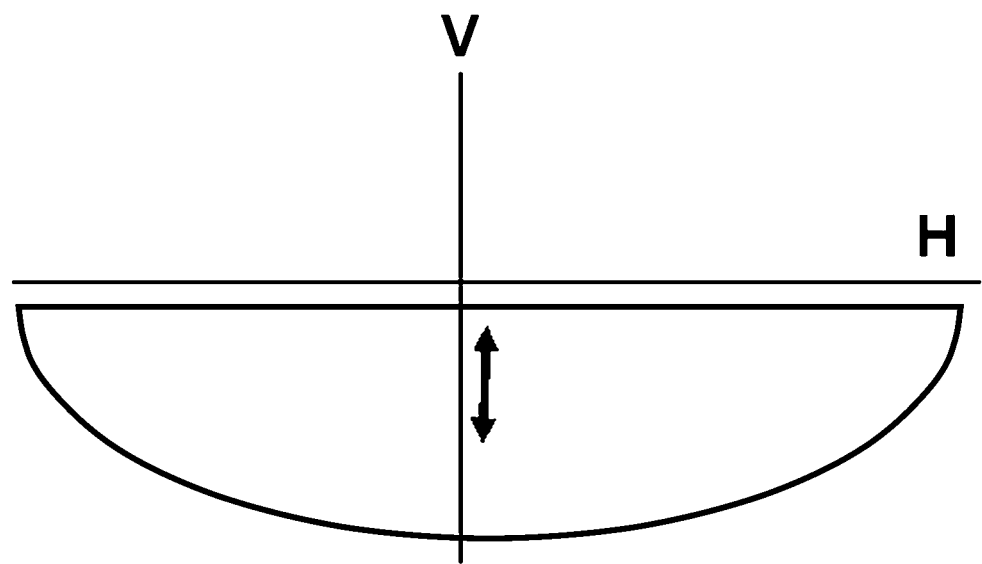
FIG. 3 is a schematic view showing a light generation area of a second module of the present disclosure.

In addition, as shown in FIG. 3, the second module 120 may be required to be finely adjusted because its beam pattern needs to start from around −0.57 degrees in the perpendicular direction according to the law. That is, the second module 120 may require more aiming in the vertical direction than in the horizontal direction. Accordingly, a light emission range may be aimed by mounting a shield 310 on the second module 120, and adjusting a range of the shield 310 in the vertical direction.

Figure 4:
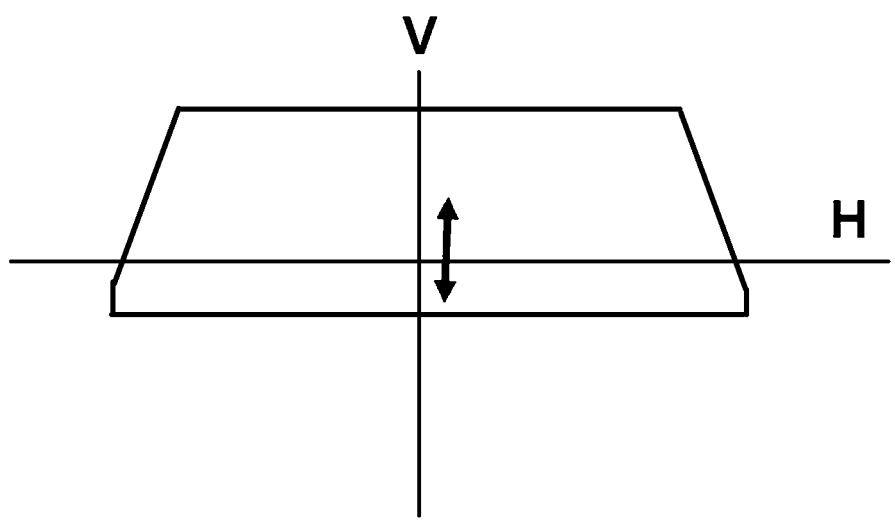
FIG. 4 is a schematic view showing a light generation area of a third module of the present disclosure.

In addition, as shown in FIG. 4, the third module 130 may implement the high beam (or may implement the low beam wide zone like the second module 120), and it is necessary to finely adjust the module because the high beam also needs to start the beam pattern from an angle higher than the center according to the regulation or based on a usage purpose. That is, the third module 130 may require more aiming in the vertical direction than in the horizontal direction like the second module 120.

Hereinafter, the description describes a first embodiment of the aiming unit 300 with reference to FIG. 5.

A position of the connection part 220 of the present disclosure may be fixed by having one surface coupled to the support part 210 and the other surface coupled to an external part. Here, the external part may be a heat sink absorbing heat from the optical module and emits heat to the outside.

Here, the external part and the connection part 220 may pass through each other and be coupled to a fastener 340 or the like.

Figure 5:
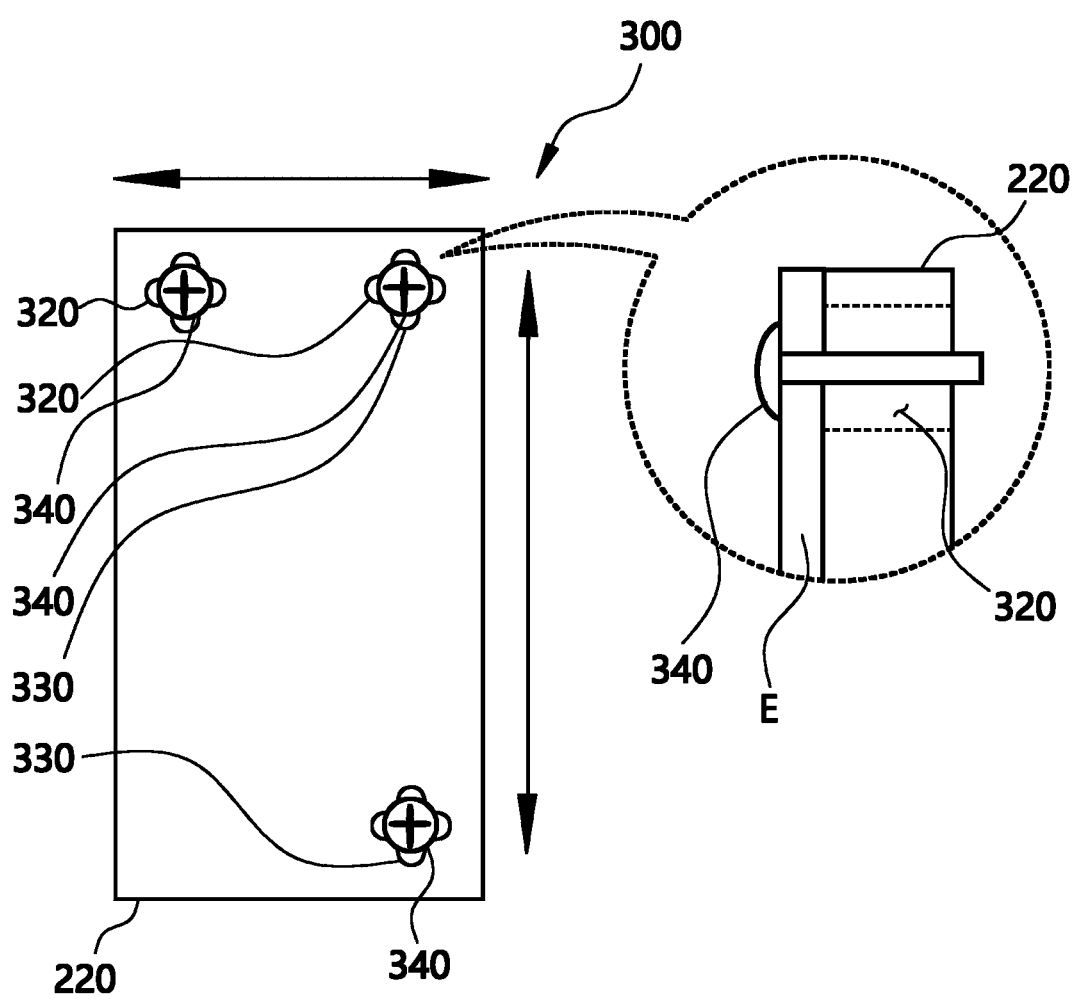
FIG. 5 is a schematic view showing a first embodiment of an aiming unit of the present disclosure.

Here, as shown in FIG. 5, the aiming unit 300 in a first embodiment may include at least two vertical position adjustment holes 320 or at least two horizontal position adjustment holes 330, each having a cross shape and passing through the connection part 220. The fastener 340 may be coupled to each of the two vertical position adjustment holes 320 and the horizontal position adjustment holes 330. In more detail, the two vertical position adjustment holes 320 and the two or more horizontal position adjustment holes 330 may be provided, the two vertical position adjustment holes 320 may be spaced apart from each other in the horizontal direction of the connection part 220, and the horizontal position adjustment holes 330 may be spaced apart from each other in the vertical direction of the connection part 220. Here, at least one of the two vertical position adjustment holes 320 and at least one of the two horizontal position adjustment holes 330 may overlap each other.

The two vertical position adjustment holes 320 and the horizontal position adjustment holes 330 may be (cross-shaped) holes respectively extending in the vertical direction and the horizontal direction. Here, the vertical or horizontal position of the connection part 220 may be adjusted based on which one of the two vertical position adjustment holes 320 or the horizontal position adjustment holes 330 the fastener 340 is coupled to. That is, the positions of the support part 210 integrally formed with the connection part 220, the optical module unit coupled to the support part 210, and the projection lens 400 inserted into the connection part 220 may all be changed together.

As described above, the position adjustment of the entire optical module aiming system 1000 is to aim the light emission position of the first module 110 implementing the low beam hot zone, and the first module 110 and the projection lens 400 may be controlled together by being dependent on each other's positions. In addition, relative positions of the second module 120, the third module 130, and the first module 110 other than the first module 110 may then be adjusted in detail. The description describes a method of adjusting the relative positions in more detail in a second embodiment of the aiming unit 300 described below.

Hereinafter, the description describes a second embodiment of the aiming unit 300 of the present disclosure with reference to FIGS. 6 to 8.

Figure 6:
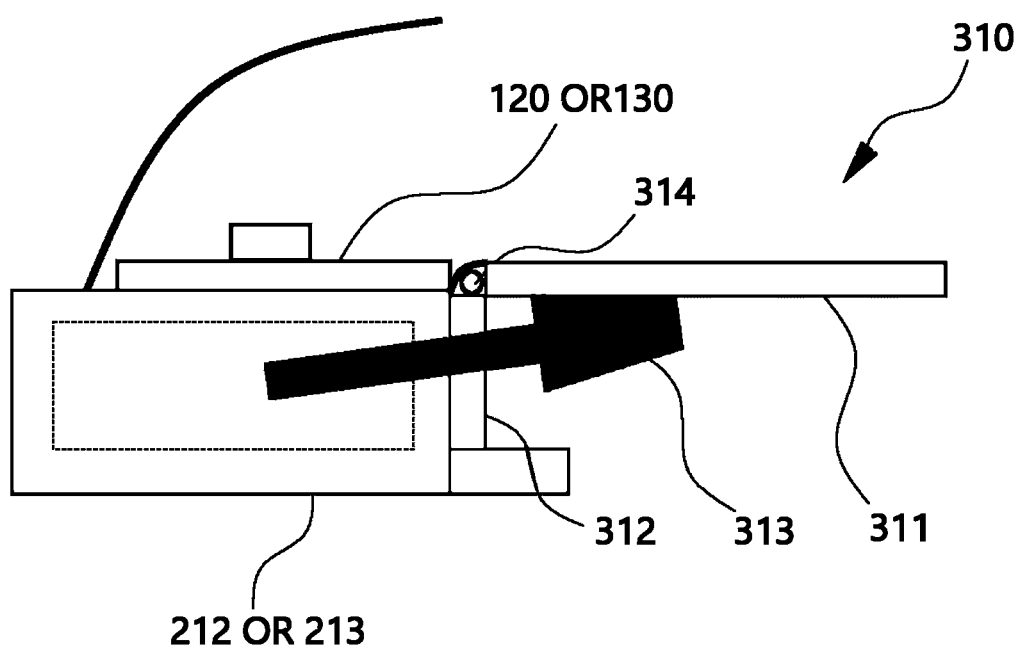
FIG. 6 is a schematic view showing a second embodiment of an aiming unit of the present disclosure.

As shown in FIG. 6, the aiming unit 300 in a second embodiment may include the shield 310 coupled to the other end of the second support part 212 or that of the third support part 213. The shield 310 may partially block an upper area of a light emission area of the second module 120, and may partially block a lower area of a light emission area of the third module 130 (when the third module 130 implements the high beam).

In more detail, the shield 310 may include a shield plate 311 extending in the other direction of the second support part 212 or that of the third support part 213, a coupling plate 312 in contact with and coupled to the other surface of the second support part 212 or that of the third support part 213, and an adjustment bolt 313 having one end passing through the coupling plate 312 and the second support part 212 or the third support part 213, and the other end in contact with a lower surface of the shield plate 311 to support the shield plate 311. The adjustment bolt 313 may have a predetermined angle that is not perpendicular to the other surface of the second support part 212 or that of third support part 213, a head of the adjustment bolt 313 may support a phase of the shield plate 311, and the shield 310 may thus provide an area where light is blocked. In more detail, the head of the adjustment bolt 313 that is in contact with the shield plate 311 may have a height higher than that of its part inserted into the second support part 212 or the third support part 213.

That is, in a second embodiment of the aiming unit 300, the shield 310 may have a height of the shield plate 311 changed by adjusting a position of the adjustment bolt 313. Here, the shield plate 311 and the coupling plate 312 may be the leaf springs integrally formed with each other. Accordingly, one end of the shield plate 311 may be supported by the coupling plate 312 and its angle may be adjusted stiffly when the angle of the shield plate 311 is adjusted based on the position of the adjustment bolt 313.

Figure 7:
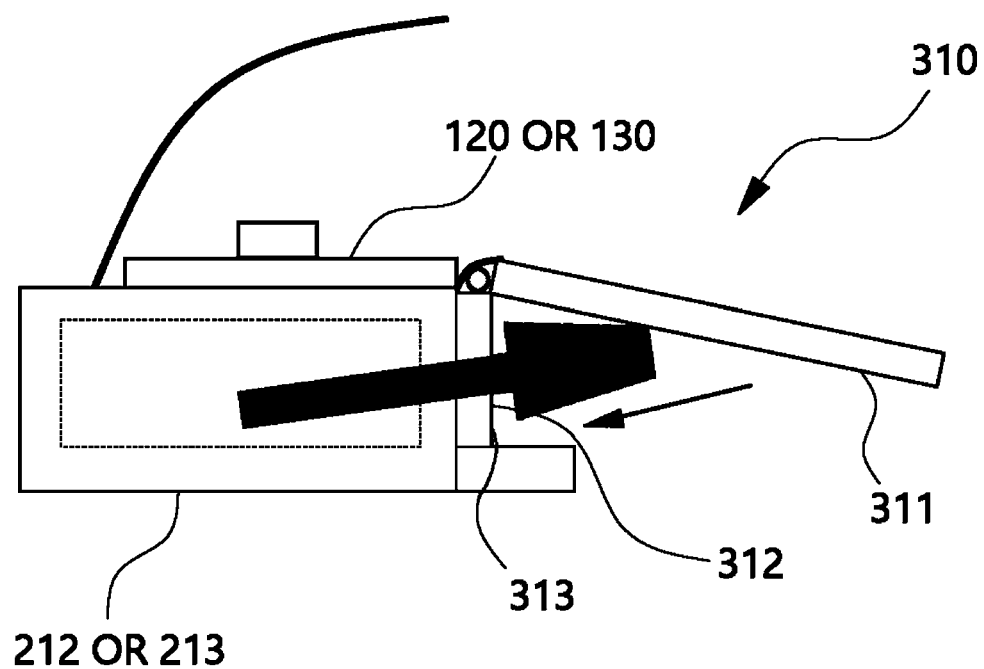
FIG. 7 is a schematic view showing upward aiming of a second embodiment of the aiming unit of the present disclosure.

Here, as shown in FIG. 7, the adjustment bolt 313 may be moved to the inside of the second support part 212 or that of the third support part 213. In this case, the head of the adjustment bolt 313 may have a lower height, and the angle of the shield plate 311 may be moved downward from one surface of the support part 210. Accordingly, an area where light is blocked by the shield plate 311 among the light emission area of the second module 120 or that of the third module 130 may be moved downward.

Figure 8:
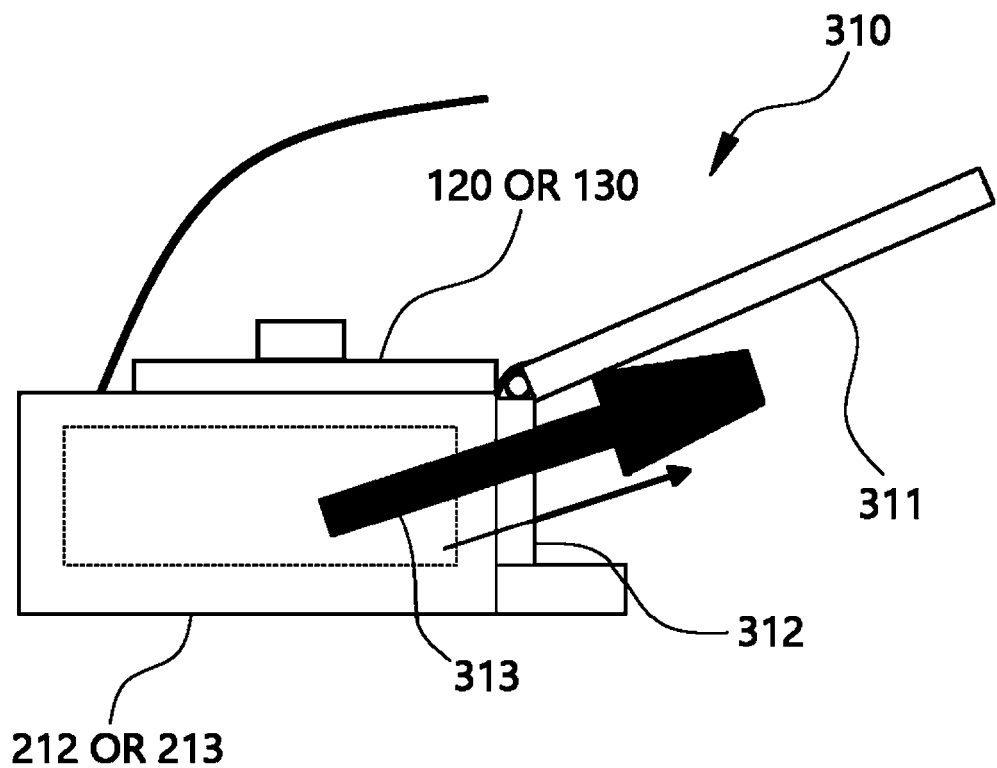
FIG. 8 is a schematic view showing downward aiming of a second embodiment of the aiming unit of the present disclosure.

On the other hand, as shown in FIG. 8, the adjustment bolt 313 may be moved to the outside of the second support part 212 or that of the third support part 213. In this case, the head of the adjustment bolt 313 may have a higher height, and the angle of the shield plate 311 may be moved upward from one surface of the support part 210. Accordingly, the area where light is blocked by the shield plate 311 among the light emission area of the second module 120 or that of the third module 130 may be moved upward.

Further, in one embodiment of the shield 310, the shield 310 may further include the third support part 213. In more detail, the third support part 213 may include an angle-changing shaft 314 disposed at a junction between the shield plate 311 and the coupling plate 312, and passing through one end of the shield plate 311 and one end of the coupling plate 312. That is, the shield plate 311 and the coupling plate 312 may be connected with each other in the form of a hinge. Due to such a structure, the angle of the shield plate 311 may be easily adjusted based on the position of the adjustment bolt 313.

Hereinafter, the description describes a third embodiment of the aiming unit 300 of the present disclosure with reference to FIG. 9.

Figure 9:
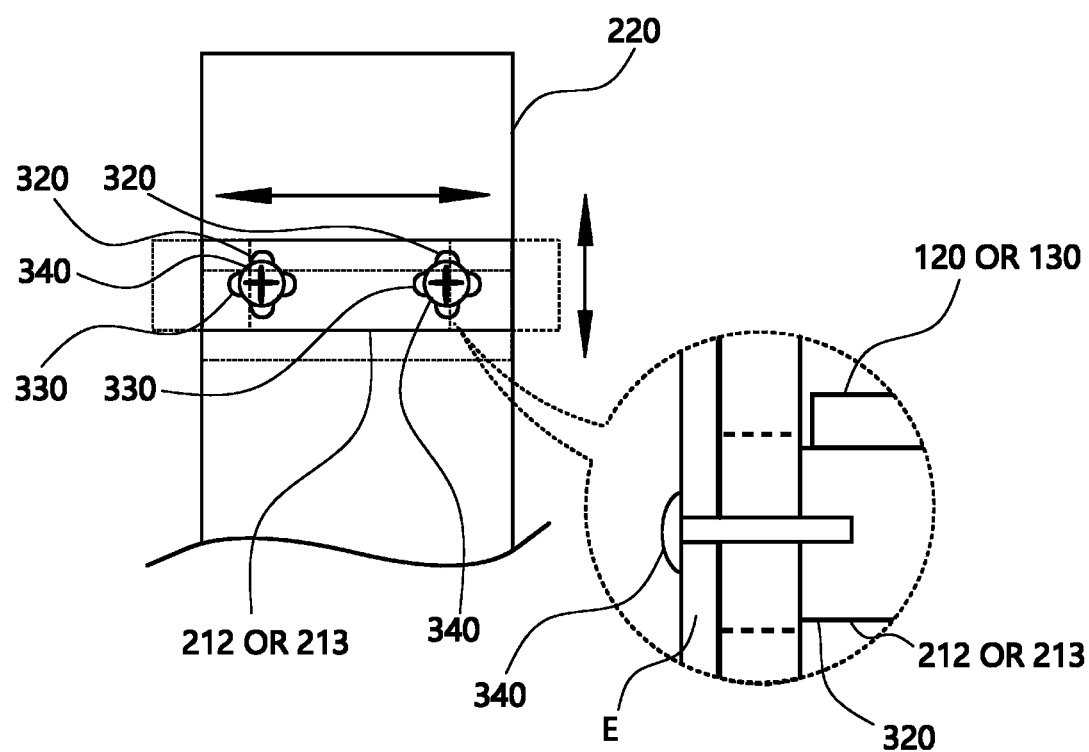
FIG. 9 is a schematic view showing a third embodiment of an aiming unit of the present disclosure.

As shown in FIG. 9, the second support part 212 or the third support part 213 may be an entity independent from the connection part 220, and the connection part 220 may have the two vertical position adjustment holes 320 or the horizontal position adjustment holes 330. Here, the second support part 212 or the third support part 213 may pass through the connection part 220 and the external part and be fixed by the fastener 340. Here, the external part may be the heat sink absorbing or releasing heat from the optical module unit 100.

In more detail, the two vertical position adjustment holes 320 and the two or more horizontal position adjustment holes 330 may respectively be provided, the two vertical position adjustment holes 320 may be spaced apart from each other in the horizontal direction of the connection part 220, and the horizontal position adjustment holes 330 may be spaced apart from each other in the vertical direction of the connection part 220. Here, at least one of the two vertical position adjustment holes 320 and at least one of the two horizontal position adjustment holes 330 may overlap each other.

The two vertical position adjustment holes 320 and the horizontal position adjustment holes 330 may be the (cross-shaped) holes extending in the vertical direction and the horizontal direction. Here, the vertical or horizontal position of the connection part 220 may be adjusted based on which one of the two vertical position adjustment holes 320 or the horizontal position adjustment holes 330 the fastener 340 is coupled to.

Furthermore, the second support part 212 or the third support part 213 may implement the wide zone. In this case, aiming in the horizontal direction may be virtually unnecessary, and the horizontal position adjustment holes 330 may thus be omitted, and only two vertical position adjustment holes 320 may be provided. Here, the two vertical position adjustment holes 320 may extend in the vertical direction. Accordingly, the height of the second support part 212 or that of the third support part 213 may be adjusted only in the vertical direction.

Hereinafter, the description describes an optical module aiming method of the present disclosure with reference to FIGS. 10 to 12.

Figure 10:
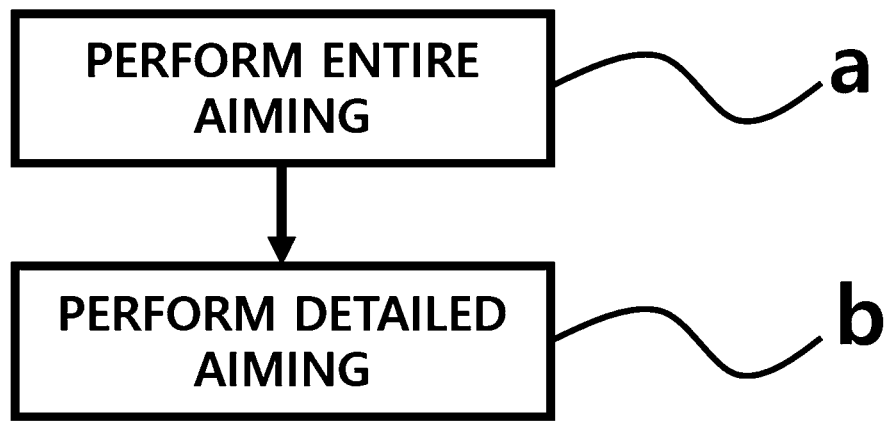
FIG. 10 is a flowchart showing an optical module aiming method of the present disclosure.

As shown in FIG. 10, the optical module aiming method using the optical module aiming system may include: (a) aiming a position of a module housing and that of an optical module unit; and (b) aiming a position of a second module 120 and that of a third module 130 in detail. Here, the second module 120 or the third module 130 may be a module implementing a low beam wide zone or a high beam wide zone.

Figure 11:
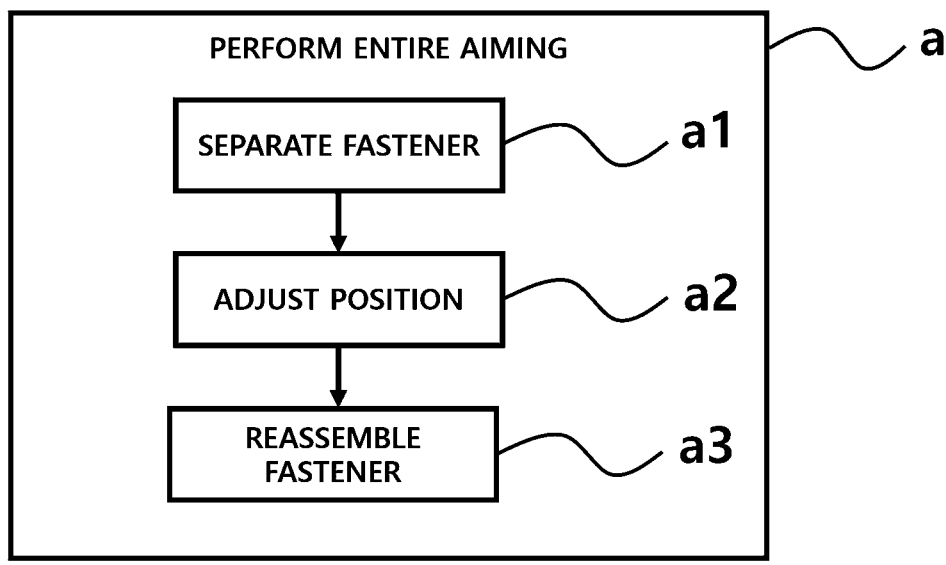
FIG. 11 is a flowchart showing detailed operations of an entire aiming operation in the optical module aiming method.

Here, as shown in FIG. 11, the operation (a) may include: (a1) separating a fastener 340 from each of two vertical position adjustment holes 320 or two horizontal position adjustment holes 330; (a2) moving and adjusting the position of the module housing 200 in a vertical direction; and (a3) inserting the fastener 340 into each of the two vertical position adjustment holes 320 or the horizontal position adjustment holes 330 again. Here, the vertical or horizontal position of the connection part 220 may be adjusted based on which one of the two vertical position adjustment holes 320 or the horizontal position adjustment holes 330 the fastener 340 is coupled to. That is, positions of a support part 210 integrally formed with the connection part 220, the optical module unit coupled to the support part 210, and a projection lens 400 inserted into the connection part 220 may all be changed together.

In addition, the operation (b) may include (b1) adjusting a coupling position of an adjustment bolt 313. Here, the adjustment bolt 313 may have a predetermined angle that is not perpendicular to the other surface of the second support part 212 or that of third support part 213, a head of the adjustment bolt 313 may support a phase of a shield plate 311, and the shield 310 may thus provide an area where light is blocked. In more detail, the head of the adjustment bolt 313 that is in contact with the shield plate 311 may have a height higher than that of its part inserted into the second support part 212 or the third support part 213.

That is, in the operation (b1), the adjustment bolt 313 may be moved to the inside of the second support part 212 or that of the third support part 213. In this case, the head of the adjustment bolt 313 may have a lower height, and the angle of the shield plate 311 may be moved downward from one surface of the support part 210. Accordingly, an area where light is blocked by the shield plate 311 among the light emission area of the second module 120 or that of the third module 130 may be moved downward.

On the other hand, the adjustment bolt 313 may be moved to the outside of the second support part 212 or that of the third support part 213. In this case, the head of the adjustment bolt 313 may have a higher height, and the angle of the shield plate 311 may be moved upward from one surface of the support part 210. Accordingly, the area where light is blocked by the shield plate 311 among the light emission area of the second module 120 or that of the third module 130 may be moved upward.

Figure 12:
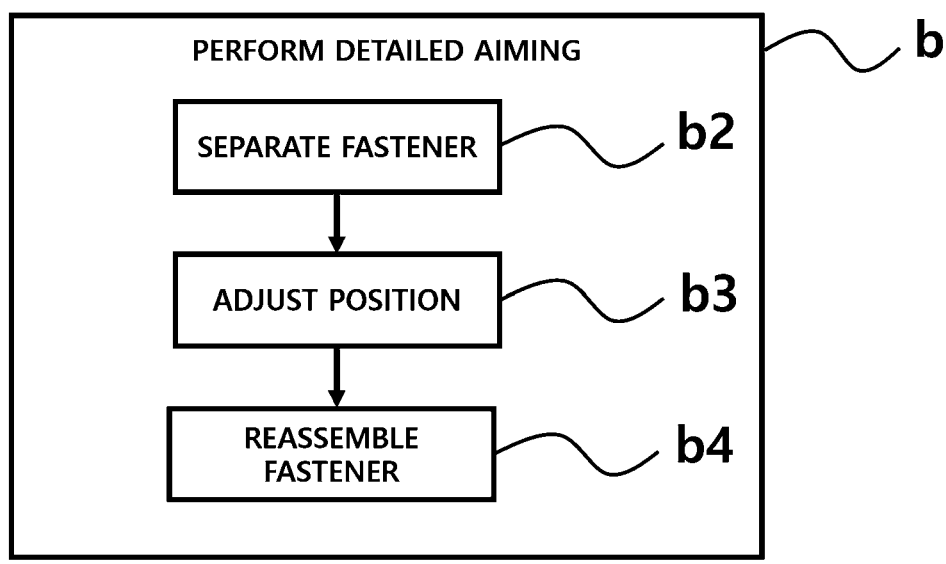
FIG. 12 is a flowchart showing detailed operations of a second embodiment of a detailed aiming operation in the optical module aiming method.

As shown in FIG. 12, the operation (b) may include: (b2) separating the fastener 340 from each of the two vertical position adjustment holes 320 or the horizontal position adjustment holes 330; (b3) moving and adjusting a position of the second support part 212 or that of the third support part 213 in the vertical direction; and (b4) inserting the fastener 340 into each of the two vertical position adjustment holes 320 or the horizontal position adjustment holes 330 again. Here, the vertical or horizontal position of the second support part 212 or that of the third support part 213 may be adjusted based on which one of the two vertical position adjustment holes 320 the fastener 340 is coupled to.

As set forth above, according to the optical module aiming system of the present disclosure having the above configuration and the optical module aiming method using the same, it is possible to individually aim the position of each module, by configuring the optical module in charge of the cut-off area or forming the hot zone, in which the outer lens, the primary optical system, and other parts are aimed together to thus enable the adjustment aiming of the hot zone where the most regulations are concentrated, and configuring the optical module forming the wide zone or high beam so that the vertical position of the shield may be adjusted from the outside using the leaf spring and the push bolt.

The spirit of the present disclosure should not be limited to the embodiments described above. The present disclosure may be applied to various fields, and may be variously modified by those skilled in the art without departing from the scope of the present disclosure claimed in the claims. Therefore, it is obvious to those skilled in the art that these alterations and modifications fall within the scope of the present disclosure.

What is claimed is:

1. An optical module aiming system comprising:
   an optical module unit comprising a plurality of optical modules including at least one light source;
   a module housing comprising a plurality of support parts each having a support surface in contact with and coupled to a lower surface of each optical module, and a connection part extending from one end of each support part and formed in a direction perpendicular to the support surface; and
   an aiming unit configured to individually adjust a position of each optical module;
   wherein the optical module unit comprises:
      a first module configured to provide a low beam hot zone,
      a second module configured to provide a low beam wide zone, and
      a third module configured to provide the low beam wide zone or a high beam,
   wherein the support part comprises:
      a first support part coupled to a lower surface of the first module,
      a second support part coupled to a lower surface of the second module, and a third support part coupled to a lower surface of the third module.

2. The system of claim 1, wherein the aiming unit includes a shield coupled to another end of the second support part or that of the third support part, and
the shield comprises:
a shield plate extending in another direction of the second support part or that of the third support part,
a coupling plate in contact with and coupled to another surface of the second support part or that of the third support part, and
an adjustment bolt having one end passing through the coupling plate and the second support part or the third support part, and the another end in contact with a lower surface of the shield plate to support the shield plate.

3. The system of claim 2, further comprising an angle-changing shaft disposed at a junction between the shield plate and the coupling plate, and passing through one end of the shield plate and one end of the coupling plate.

4. The system of claim 2, wherein the adjustment bolt has a predetermined angle that is not perpendicular to the another surface of the second support part or that of third support part.

5. The system of claim 1, wherein:
the aiming unit comprises at least two vertical position adjustment holes or at least two horizontal position adjustment holes, each having a cross shape and passing through the connection part,
the vertical position adjustment holes are spaced apart from each other in a horizontal direction of the connection part,
the horizontal position adjustment holes are spaced apart from each other in a vertical direction of the connection part, and
a fastener is coupled to each of a vertical position adjustment holes and the horizontal position adjustment holes.

6. The system of claim 1, in which the second support part or the third support part is an entity independent from the connection part, further comprising:
at least two vertical position adjustment holes extending in the vertical direction and respectively passing through the connection part and the second support part or the third support part; and
a fastener passing through the second support part and the connection part or the third support part and the connection part together and connecting the support part and the connection part to each other.

7. The system of claim 1, wherein the connection part comprises:
a lens holder coupled to each of its upper and lower ends, and
a projection lens sandwiched between the respective lens holders.

8. An optical module aiming method using the optical module aiming system of claim 1, the method comprising:
aiming a position of a module housing and that of an optical module unit; and
aiming a position of a second module and that of a third module in detail;
wherein aiming the position of the module housing and that of the optical module unit comprises:
separating a fastener from a vertical position adjustment hole or a horizontal position adjustment hole;
moving and adjusting the position of the module housing in a vertical direction; and
inserting the fastener into the vertical position adjustment hole or the horizontal position adjustment hole again.

9. The method of claim 8, wherein aiming the position of the second module and that of the third module in detail comprises adjusting a coupling position of an adjustment bolt.

10. The method of claim 8, wherein aiming the position of the second module and that of the third module in detail comprises:
separating a fastener from a vertical position adjustment hole;
moving and adjusting a position of the second module or that of the third module in a vertical direction; and
inserting the fastener into the vertical position adjustment hole again.

11. An optical module aiming system comprising:
an optical module unit comprising a plurality of optical modules including at least one light source;
a module housing comprising a plurality of support parts each having a support surface in contact with and coupled to a lower surface of each optical module, and a connection part extending from one end of each support part and formed in a direction perpendicular to the support surface; and
an aiming unit configured to individually adjust a position of each optical module;
wherein:
the aiming unit comprises at least two vertical position adjustment holes or at least two horizontal position adjustment holes, each having a cross shape and passing through the connection part,
the vertical position adjustment holes are spaced apart from each other in a horizontal direction of the connection part,
the horizontal position adjustment holes are spaced apart from each other in a vertical direction of the connection part, and
a fastener is coupled to each of a vertical position adjustment holes and the horizontal position adjustment holes.

12. The system of claim 11, wherein the optical module unit comprises:
a first module configured to provide a low beam hot zone,
a second module configured to provide a low beam wide zone, and
a third module configured to provide the low beam wide zone or a high beam,
wherein the support part comprises:
a first support part coupled to a lower surface of the first module,
a second support part coupled to a lower surface of the second module, and
a third support part coupled to a lower surface of the third module.

13. The system of claim 12, wherein the aiming unit includes a shield coupled to another end of the second support part or that of the third support part, and
the shield comprises:
a shield plate extending in another direction of the second support part or that of the third support part,
a coupling plate in contact with and coupled to another surface of the second support part or that of the third support part, and
an adjustment bolt having one end passing through the coupling plate and the second support part or the third support part, and the another end in contact with a lower surface of the shield plate to support the shield plate.

14. The system of claim 13, further comprising an angle-changing shaft disposed at a junction between the shield plate and the coupling plate, and passing through one end of the shield plate and one end of the coupling plate.

15. The system of claim 13, wherein the adjustment bolt has a predetermined angle that is not perpendicular to the another surface of the second support part or that of third support part.

16. The system of claim 12, in which the second support part or the third support part is an entity independent from the connection part, further comprising:
   at least two vertical position adjustment holes extending in the vertical direction and respectively passing through the connection part and the second support part or the third support part; and
   a fastener passing through the second support part and the connection part or the third support part and the connection part together and connecting the support part and the connection part to each other.

17. The system of claim 11, wherein the connection part comprises:
   a lens holder coupled to each of its upper and lower ends, and
   a projection lens sandwiched between the respective lens holders.

* * * * *